(12) United States Patent
Li et al.

(10) Patent No.: US 7,620,198 B2
(45) Date of Patent: Nov. 17, 2009

(54) WATERMARK CODING METHOD AND RECORDING MEDIUM THEREOF

(75) Inventors: Chien-Ju Li, Hsinchu (TW); Guo-Zua Wu, Hsinchu (TW); Meng-Han Tsai, Hsinchu (TW); Kun-Ta Wu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 539 days.

(21) Appl. No.: 10/880,513

(22) Filed: Jul. 1, 2004

(65) Prior Publication Data

US 2005/0135654 A1 Jun. 23, 2005

(30) Foreign Application Priority Data

Dec. 23, 2003 (TW) .............................. 92136626 A

(51) Int. Cl.
- *G06K 9/00* (2006.01)
- *G06K 9/36* (2006.01)
- *H04L 9/00* (2006.01)
- *H04L 9/32* (2006.01)
- *B42D 15/00* (2006.01)
- *H04N 1/40* (2006.01)

(52) U.S. Cl. ..................... 382/100; 382/276; 380/46; 713/176; 283/113; 358/3.28

(58) Field of Classification Search ................ 382/100, 382/276; 380/46; 713/176; 283/113; 358/3.28; 258/3.28

See application file for complete search history.

(56) References Cited

U.S. PATENT DOCUMENTS

| | | | |
|---|---|---|---|
| 6,768,807 B1* | 7/2004 | Muratani | 382/100 |
| 7,031,491 B1* | 4/2006 | Donescu et al. | 382/100 |
| 7,088,843 B2* | 8/2006 | Pelly | 382/100 |
| 7,181,042 B2* | 2/2007 | Tian | 382/100 |
| 7,227,900 B2* | 6/2007 | Porter et al. | 375/240.27 |
| 2004/0091050 A1* | 5/2004 | Choi et al. | 375/240.18 |
| 2004/0172548 A1* | 9/2004 | Anderson et al. | 713/193 |

OTHER PUBLICATIONS

Cox, et al., "Secure Spread Spectrum Watermarking for Multimedia." IEEE Transactions on Image Processing. 6(1997): 1673-1687.*
Lien et al. "A Secure Watermarking Technique for the Object-Oriented Video Encoding System." 16th IPPR Conference on Computer Vision, Graphics and Image Processing 16(2003): 552-559.*
Kang, et al. "An Image Watermarking Algorithm Robust to Geometric Distortion." Lecture Notes in Computer Science 2613/2003(2003): 119-127.*
Hernadez, et al. "Shedding More Light on Image Watermarks." Lecture Notes in Computer Science 1525/1998(1998): 191-207.*

* cited by examiner

*Primary Examiner*—Matthew C Bella
*Assistant Examiner*—Michael A Newman
(74) *Attorney, Agent, or Firm*—Birch, Stewart, Kolasch & Birch, LLP

(57) ABSTRACT

A watermark coding method and its recording medium utilize image interleaving and wavelet-based transformation to enhance the robustness of the image. The watermark series to be inserted is converted, encrypted, and modulated to increase the difficulty in decoding and restoring. Finally, the watermark is distributed and hidden in various frequency bands of the image in a frequency hopping way, generating a robust watermarked image. When used in a recording medium, side information produced during coding is recorded in the lead-in area of the recording medium to reduce the chances of illegal copying.

13 Claims, 9 Drawing Sheets

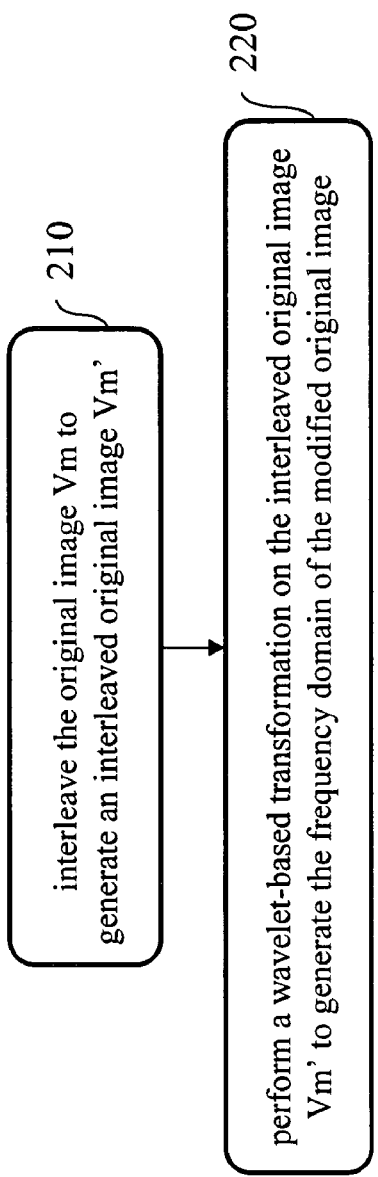
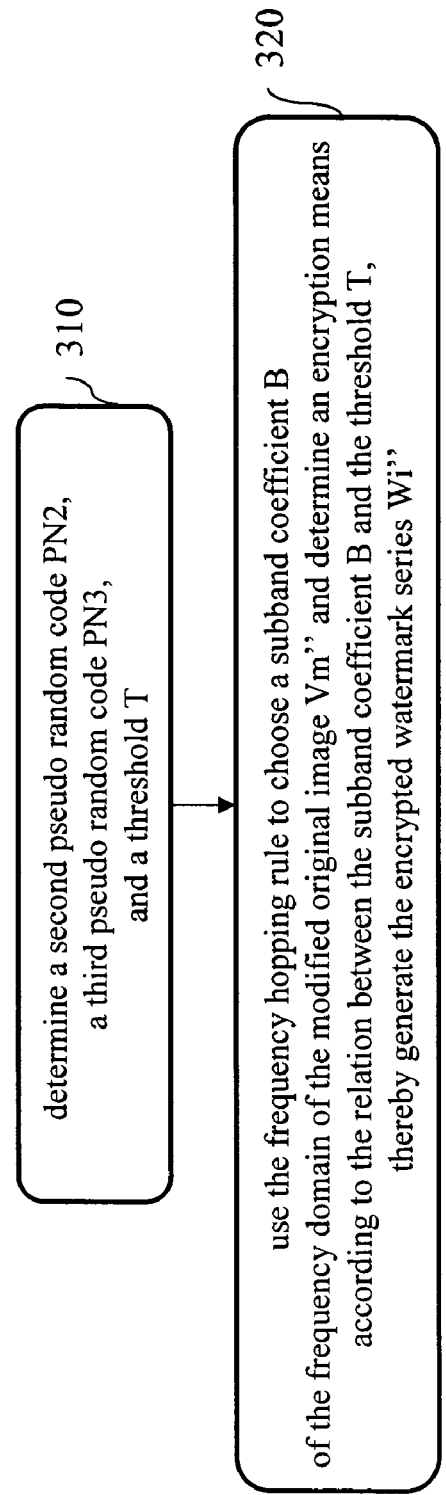

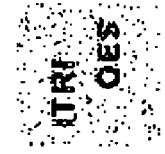
FIG. 7

 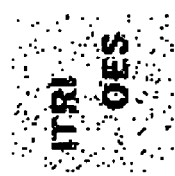
FIG. 8

FIG. 9

FIG. 10B
FIG. 10A

WATERMARK CODING METHOD AND RECORDING MEDIUM THEREOF

This Non-provisional application claims priority under 35 U.S.C. § 119(a) on Patent Application No(s). 092136626 filed in Taiwan on Dec. 23, 2003, the entire contents of which are hereby incorporated by reference.

BACKGROUND OF THE INVENTION

1. Field of Invention

The invention relates to a watermark coding method and, in particular, to a coding method that produces a robust watermark image in an audio-video (AV) recording medium without occupying storage space therein.

2. Related Art

In the digital era, information digitalization has become a trend. Due to the ease in propagation and copy of digital image data (such as pictures, videos, etc), the protection of the digital image data is not as easy as conventional ones. Therefore, relevant intellectual property (IP) problems are widely concerned. To ensure the safety in digital image data transmissions and to prevent hackers from eavesdropping, a common method is the watermark coding technology.

Digital watermarking is a novel technique, which is the digital information imperceptibly embedded in the multimedia (host data), so that unauthorized users cannot arbitrarily use the multimedia. Therefore, most of current digital image data are coded in such a way. Although the current watermark coding technology claims to be very robust, one usually still requires the assistance of the original image in order to restore the image. This limitation results in the waste of a large storage space in the recording medium to store the original image. This is very impractical. By deduction, one usually is able to find out the correlation between any two consecutive images using the watermark techniques that require the help of the original image. Thus, the watermark is easy to be decoded.

A good watermark coding technology has to satisfy the following three properties in order to really protect the original image. (1) It is not easy to be perceived or detected. That is, the embedded watermark cannot be easily discovered using normal image processing methods. In addition, the tiny difference due to the watermark in the image has to be beyond the sensitivity of the human visual system. (2) It has to be robust. The embedded watermark can resist various kinds of attacks, including image processing, magnification, shrinking, rotation, compression, and modification. (3) It does not require the original image. During the watermark detection or extraction process, it does not need to store a copy of the original image.

When the watermark coding technology is used in a recording medium, it has to be able to prevent the following different methods of pirate copying: (1) digital-to-digital copying (e.g. recording media copying); (2) digital-to-analog copying (e.g. copying TV program to VCR); and (3) analog-to-digital copying (e.g. converting V8 data into digital videos).

Therefore, a complete watermark coding technology does not only need to be robust and resistant to decryption, it should be able to be implemented on current recording media. It should avoid different types of pirate copying behaviors and does not occupy too much recording media space.

SUMMARY OF THE INVENTION

In view of the foregoing, the invention proposes a new watermark coding method and its recording medium.

The technical features of the disclosed method include: (1) increasing the robustness of the watermark; and (2) establishing the anti-copy mechanism for the recording medium.

In the respect of watermark robustness, the technical means apply interleaving and wavelet-based transformation to the original image. The watermark to be embedded is converted, encrypted, and modulated so that it is hard to decode and restore. Finally, the watermark is hidden in various bands of the image in a frequency hopping way.

To achieve the above-mentioned effects, the disclosed method includes the steps of: determining a first pseudo random code (PN code) for performing a watermark series conversion to generate a permuted watermark series; converting an original image to generate a modified original image; generating an encrypted watermark series according to the frequency domain of the modified original image other pseudo codes and permuted watermark series Wi'; modulating the encrypted watermark series to generate a modulated watermark series; hiding the modulated watermark series in the frequency domain of the modified original image according to a frequency hopping rule; and converting the frequency domain of the modified original image into the spatial domain to obtain the watermarked image.

In the respect of establishing anti-copy mechanism for recording media, the invention records side information used in the watermark coding process in the lead-in area of the recording medium. It uses the property that the lead-in area cannot be arbitrarily read to effectively prevent the pirate copying behaviors. Therefore, even if one is able to obtain the complete watermark-hidden image in the recording medium, he or she still cannot easily extract the image contents because of the lack of correct side information.

Moreover, the recording medium using the disclosed watermark coding technology only requires the simple side information for coding to achieve image restoration without the assistance of the original image. In comparison with the prior art, the invention can effectively save the recording medium space and increase the restoring and decoding efficiencies.

BRIEF DESCRIPTION OF THE DRAWINGS

The invention will become more fully understood from the detailed description given hereinbelow illustration only, and thus are not limitative of the present invention, and wherein:

FIG. 2 is a flowchart for generating the frequency domain of the modified original image according to the invention;

FIG. 3 is a flowchart for generating the encrypted watermark series according to the invention;

FIGS. 6A to 10B are schematic views showing the embodiments of the restored hidden watermarks from various attacks.

DETAILED DESCRIPTION OF THE INVENTION

The invention provides a watermark coding method, which can be widely and conveniently used in existing recording media.

Figure 1:
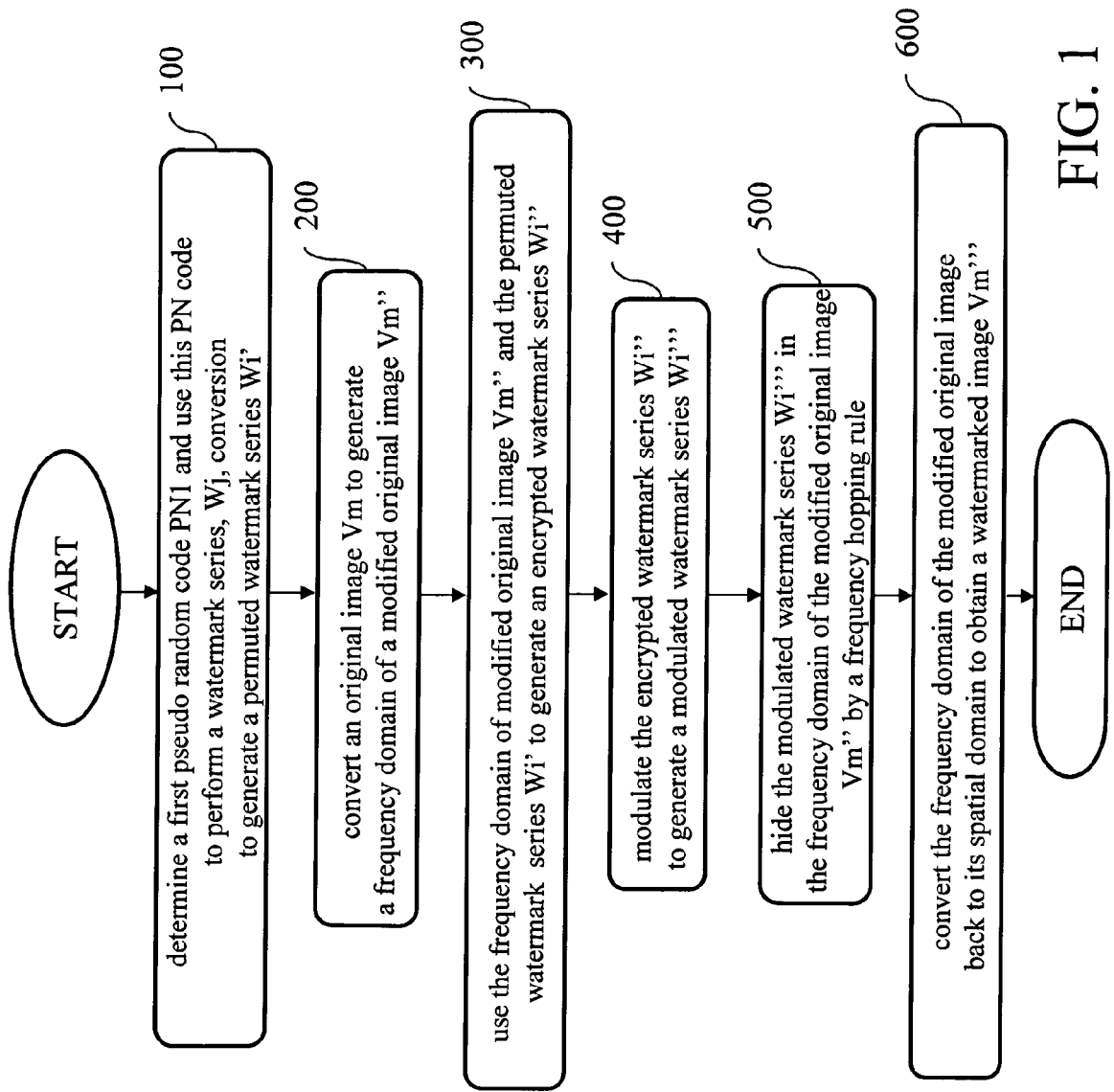
FIG. 1 is the main flowchart of the disclosed watermark coding method.

FIG. 1 is a flowchart of the disclosed method. First, a pseudo random code PN1 is first determined to convert a watermark series Wj, generating a permuted watermark series Wi' (step 100). The purpose of the conversion is to hide the original state of the watermark so that other unauthorized users cannot easily know of. The first pseudo random code PN1 is a positive integer whose magnitude is equal to the length of the watermark series Wj. The conversion is represented by the following equation:

$$Wi' = \{Wj | 1 \leq j \leq PN1\} 1 \leq i \leq PN1, i \neq j.$$

After completing the random number conversion for the watermark series, the original image Vm is converted (step 200). With simultaneous reference to FIG. 2, the conversion process interleaves the original image Vm and destroys the relation of the original image Vm. The spectrum in the gamma distribution is first converted into the one in the Gaussian distribution. This re-arrange the original image Vm so that the average value of the spectrum becomes more stable, which is food for the watermark hiding process (step 210). Afterwards, the method performs a wavelet-based transformation to generate the frequency domain of the modified original image Vm" (step 220). The wavelet-based transformation is achieved using a normal Daubechies-4taps filter. This part is well known in the prior art and will not be further described.

The frequency domain of the modified original image Vm" and the permuted watermark series Wi' are further used to generate an encrypted watermark series Wi" (step 300). With simultaneous reference to FIG. 3, step 300 needs the knowledge of three parameters, including a second pseudo random code PN2, a third pseudo random code PN3, and a threshold T determined in step 310. The second pseudo random code PN2 and the third pseudo random code PN3 are two different binary random numbers and their length is equal to the length of the watermark series Wj. The threshold T is the mean value of each subband. For the convenience of operational processing, we may also directly set T as 0. Afterwards, a predetermined frequency hopping rule is employed to extract the subband coefficients B of the modified original image Vm". (The frequency hopping rule is used to hide each watermark bit in over two different subbands in different resolution layers. This can reduce the chances of being damaged and increase the convenience of restoration. The frequency hopping method can be modified at any time.) The final encryption means used to generate the encrypted watermark series Wi" is determined according to the relations (bigger or smaller) among the subband coefficients B and the threshold T (step 320). This part of the algorithm is expressed as follows:

$$\begin{cases} Wi'' = Wi' \oplus PN2(i) & B > T \\ & \text{for each} \\ Wi'' = Wi' \oplus PN3(i) & B < T \end{cases}, 1 \leq i \leq PN2 (\text{or } PN3);$$

where $\oplus$ refers to the eXclusive OR (XOR) operation.

After the encrypted watermark series Wi" is obtained, it is modulated to produce a modulated watermark series Wi'" (step 400). The modulation is achieved using the well-known binary phase shift keying (BPSK), represented by the equation below:

$$Wi''' = \begin{cases} 1*C & Wi'' = 1 \\ & \text{for each} \\ -1*C & Wi'' = 0 \end{cases}, 1 \leq i \leq PN2(\text{or } PN3);$$

where C is a constant positive integer.

Figure 4:
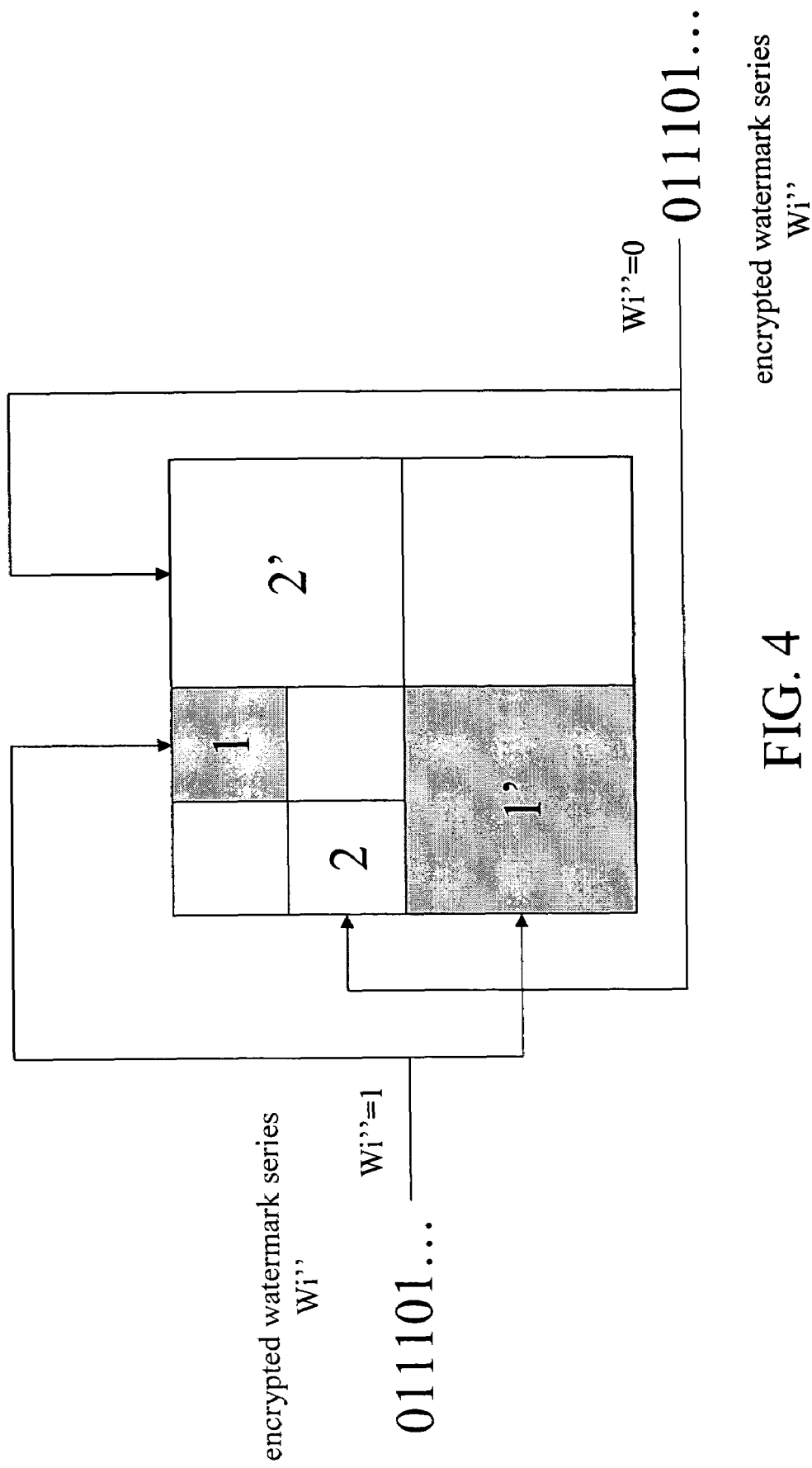
FIG. 4 is a schematic view of hiding the watermark series in the frequency domain of the modified original image according to the invention.

Once the modulation is completed, the frequency hopping rule described above is then used to hide the modulated watermark series Wi'" in the frequency domain of the modified original image Vm" (step 500). The frequency hopping means is schematically shown in FIG. 4. Basically, the hiding method is to embed each watermark bit into over two different subbands in different resolution layers. Here we use the example of embedding the watermark bits into two subbands. When the value of the bit choosed from the encrypted watermark series Wi" is 1, the watermark bit is embedded into the selected-subband of the image (subband "1" in FIG. 4). Finally, the modified original image Vm" in the frequency domain is converted into the spatial domain, rendering a watermark-hidden image Vm'" (step 600). This completes the watermark coding method.

FIGS. 6A to 10B show embodiments of image restoration when the hidden watermark is under various kinds of attacks.

Figure 6B:
Figure 6A:

In FIGS. 6A and 6B, the watermark-hidden images (upper drawings) are under MPEG-1 and MPEG-2 image compressions, respectively. The extracted watermarks are shown in the lower part. In FIG. 7, the watermark-hidden image (upper drawing) is interfered by Gaussian noises of different strengths (5 dB, 3 dB and 2 dB, respectively) and the extracted watermarks are shown in the lower part. In FIG. 8, the watermark-hidden image (upper drawing) is under both image compression and Gaussian noise attacks, with the extracted watermark shown in the lower part. In FIG. 9, the watermark-hidden image (upper drawing) is under the cutting attack, with the extracted watermark shown in the lower part. In FIGS. 10A and 10B, the watermark-hidden images (upper drawings) are re-sampled, with the respective extracted watermarks shown in the lower part. It is thus seen that under either kind of attacks, the watermark generated using the disclosed method can be clearly extracted. This proves that the disclosed watermark is very robust.

Moreover, the disclosed watermark coding method can be further applied to a recording medium as an anti-copy mechanism.

Figure 5:
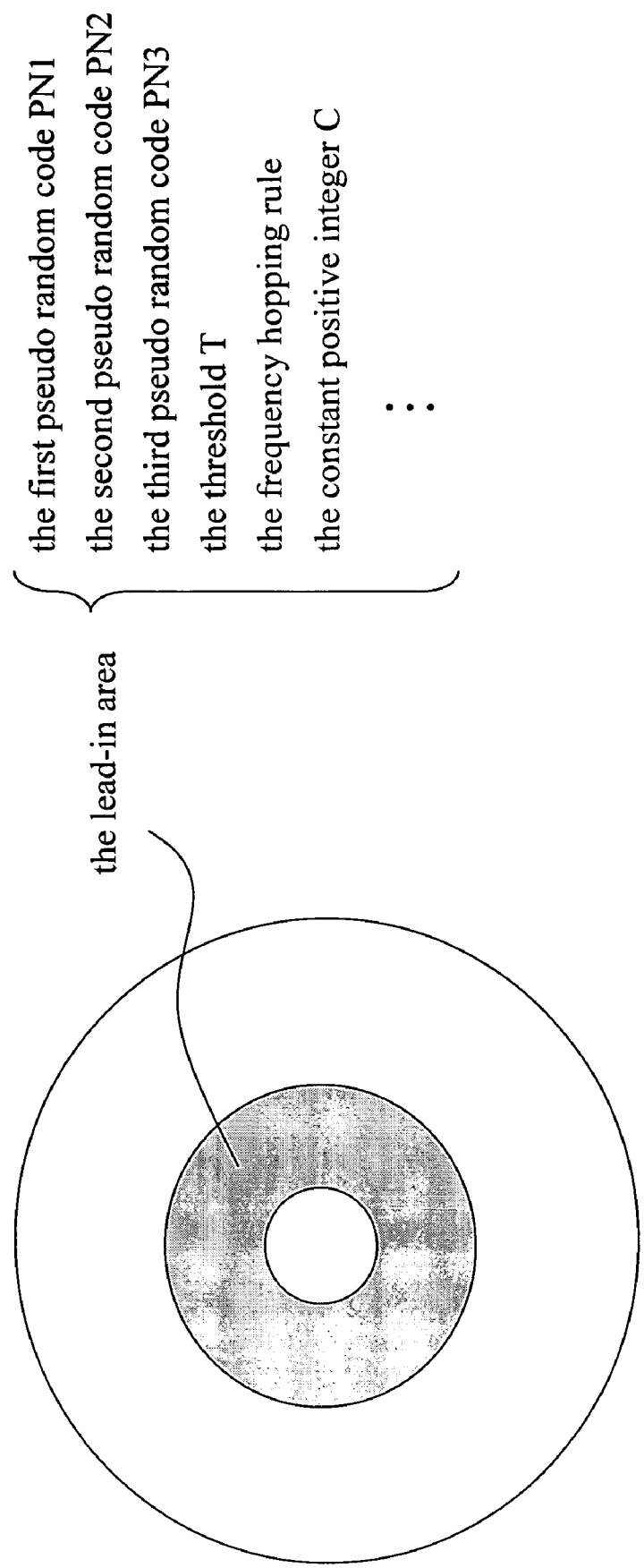
FIG. 5 is a schematic view of hiding the watermark in the recording medium according to the invention.

The disclosed watermark coding method does not need the assistance of the original image during the extracting process, it only requires the side information used in the coding process. Therefore, using the invention on recording media can easily solve the problem of storing a huge amount of original image information in the prior art. As shown in FIG. 5, the side information used in the coding process includes: the first pseudo random code PN1, the second pseudo random code PN2, the third pseudo random code PN3, the threshold T, the frequency hopping rule, and the constant positive integer C. They are recorded in the lead-in area of the recording medium. The lead-in area cannot be arbitrarily accessed by usual duplication techniques. The invention uses this property to record side information, avoiding pirate duplications. By recording side information in the lead-in area, the player can rapidly and correctly extract the watermark hidden in the image, thereby playing the contents according to the predetermined conditions. Of course, one may hide watermarks of different playing conditions in the recording medium at the same time for different players to produce different effects.

In fact the side information described above is only a preferred embodiment of the invention. The side information contents can be determined according to the actual situation. For example, the threshold T, the frequency hopping rule, and the constant positive integer can be pre-defined in the player in order to extract the watermark directly.

Once the disclosed watermark coding method is applied to recording media, one only need to modify the side information from time to time for effectively preventing the watermarks from being damaged or the recording media being illegally duplicated.

Certain variations would be apparent to those skilled in the art, which variations are considered within the spirit and scope of the claimed invention.

What is claimed is:

1. A watermark coding method for hiding a digital watermark into a digital image to generate a robust protection, applied in a recording media, the method comprising the steps of:
   determining a first pseudo random code PN1 and using this PN code to perform a watermark series, Wj, conversion to generate a permuted watermark series Wi';
   converting an original image Vm to generate a frequency domain of a modified original image Vm", comprising the steps of;
   interleaving the original image Vm to generate an interleaved original image Vm'; and
   transforming the interleaved original image Vm' into the frequency domain of the modified original image Vm";
   using the frequency domain of the modified original image Vm" and the permuted watermark series Wi' to generate an encrypted watermark series Wi", further comprises the steps of:
   determining a second pseudo random code PN2, a third pseudo random code PN3, and a threshold T; and
   using a frequency hopping rule to choose a subband coefficient B of the frequency domain of the modified original image Vm" and determining an encryption means according to the relation between the subband coefficient B and the threshold T, thereby generating the encrypted watermark series Wi";
   modulating the encrypted watermark series Wi" to generate a modulated watermark series Wi''';
   hiding the modulated watermark series Wi''' in the frequency of the modified original image Vm" by the frequency hopping rule; and
   converting the frequency domain of the modified original image back to its spatial domain to obtain the watermarked image Vm'''.

2. The watermark coding method of claim 1, wherein the first pseudo random code PN1 is a positive integer whose value is equal to the length of the watermark series Wj and the step of determining a first random code PN1 and using this PN code to perform a watermark series, Wj, conversion to generate a permuted watermark series Wi' uses the following equation:

$$Wi' = \{Wj | 1 \leq j \leq PN1\} \; 1 \leq i \leq PN1, i \neq j.$$

3. The watermark coding method of claim 1, wherein in the step of converting an original image Vm to generate a frequency domain of a modified original image Vm", performing a wavelet-based transformation on the interleaved original image Vm' to generate the frequency domain of the modified original image using a Daubechies 4-taps filter.

4. The watermark coding method of claim 1, wherein the second pseudo random code PN2 and the third pseudo random code PN3 are different random binary numbers whose lengths are equal to the length of the watermark series Wj.

5. The watermark coding method of claim 1, wherein the threshold T is selected from the mean value of each subband.

6. The watermark coding method of claim 1, wherein the step of using the frequency hopping rule to extract a subband coefficient B of the frequency domain of the modified original image Vm" and determining an encryption means according to the relation between the subband coefficient B and the threshold T, thereby generating the encrypted watermark series Wi" uses the following equation:

$$\begin{cases} Wi'' = Wi' \oplus PN2(i) & B > T \\ Wi'' = Wi' \oplus PN3(i) & B < T \end{cases} \text{for each}, 1 \leq i \leq PN2(\text{or } PN3);$$

where $\oplus$ refers to the eXclusive OR (XOR) operation.

7. The watermark coding method of claim 1, wherein the frequency hopping rule hides each watermark bit on different subbands in different resolution layers.

8. The watermark coding method of claim 1, wherein the step of modulating the encrypted watermark series Wi" to generate a modulated watermark series Wi''' is achieved by binary phase shift keying (BPSK).

9. The watermark coding method of claim 1, wherein the step of modulating the encrypted watermark series Wi" to generate a modulated watermark series Wi''' uses the following equation:

$$Wi''' = \begin{cases} 1 * C & Wi'' = 1 \\ -1 * C & Wi'' = 0 \end{cases} \text{for each}, 1 \leq i \leq PN2(\text{or } PN3);$$

where C is a constant positive integer.

10. A computer-readable medium having recorded thereon:
   a side information; and
   watermarked image coded by a watermark coding method using the side information, wherein the coding method comprises the steps of:
   determining a first pseudo random code PN1 and using this PN code to perform a watermark series, Wj, conversion to generate a permuted watermark series Wi';
   converting an original image Vm to generate a frequency domain of a modified original image Vm", comprising the steps of:
   interleaving the original image Vm to generate an interleaved original image Vm'; and
   transforming the interleaved original image Vm' into the frequency domain of the modified original image Vm";
   using the frequency domain of the modified original image Vm" and the permuted watermark series Wi' to generate an encrypted watermark series Wi", further comprises the steps of:
   determining a second pseudo random code PN2, a third pseudo random code PN3, and a threshold T; and
   using a frequency hopping rule to choose a subband coefficient B of the frequency domain of the modified original image Vm" and determining an encryption means according to the relation between the subband coefficient B and the threshold T, thereby generating the encrypted watermark series Wi";

modulating the encrypted watermark series Wi" to generate a modulated watermark series Wi'";

hiding the modulated watermark series Wi'" in the frequency of the modified original image Vm" by the frequency hopping rule; and converting the frequency domain of the modified original image back to its spatial domain to obtain the watermarked image Vm'".

11. The computer-readable medium of claim 10, wherein the medium has a lead-in area recorded with the side information.

12. The computer-readable medium of claim 10, wherein the recording medium is a disc.

13. The computer-readable medium of claim 10, wherein the side information enables a player to correctly obtain a watermark hidden in the watermarked image to determine a playing condition of the watermarked image.

* * * * *